United States Patent [19]
Chen et al.

[11] Patent Number: 6,134,122
[45] Date of Patent: Oct. 17, 2000

[54] INTEGRATED VOLTAGE AND CURRENT MODE CONTROLLER FOR A POWER CONVERTER AND METHOD OF OPERATION THEREOF

[75] Inventors: Qing Chen, Plano; Del Ray Hilburn, Mesquite, both of Tex.

[73] Assignee: Lucent Technologies Inc., Murray Hill, N.J.

[21] Appl. No.: 09/232,444

[22] Filed: Jan. 15, 1999

[51] Int. Cl.[7] .................................................. H02M 3/335
[52] U.S. Cl. ............................................. 363/21; 363/97
[58] Field of Search ............................. 363/20, 21, 97, 363/71; 323/284, 285, 286, 287

[56] References Cited

U.S. PATENT DOCUMENTS

| | | | |
|---|---|---|---|
| 5,428,523 | 6/1995 | McDonnal | 363/71 |
| 5,627,460 | 5/1997 | Bazinet et al. | 323/288 |
| 5,731,692 | 3/1998 | Garcia | 323/274 |
| 5,994,885 | 11/1999 | Wilcox et al. | 323/285 |

*Primary Examiner*—Peter S. Wong
*Assistant Examiner*—Gary L. Laxton

[57] ABSTRACT

For use with a power converter having a modulator, a controller and a method of operating the same. In one embodiment, the controller includes: (1) signal processing circuitry that develops a unified control signal based on an output voltage, an output current and a current sharing signal of the power converter and (2) compensation circuitry, coupled to the signal processing circuitry, that compares the unified control signal with a reference signal to develop a modulator control signal for the modulator.

21 Claims, 3 Drawing Sheets

INTEGRATED VOLTAGE AND CURRENT MODE CONTROLLER FOR A POWER CONVERTER AND METHOD OF OPERATION THEREOF

TECHNICAL FIELD OF THE INVENTION

The present invention is directed, in general, to power conversion and, more specifically, to an integrated voltage and current mode controller for a power converter and method of operating the same.

BACKGROUND OF THE INVENTION

The traditional reliability of telecommunication systems that users have come to expect and rely upon is based in part on the systems' operation on redundant equipment and power supplies. Telecommunication systems, for example, route tens of thousands of calls per second. The failure of such systems, due to either equipment breakdown or loss of power, is unacceptable since it would result in a loss of millions of telephone calls and a corresponding loss of revenue.

Power plants, such as battery plants, address the power loss problem by providing the system with a secondary source of power, such as batteries, in the event of the loss of a primary source of power. A typical power plant includes a number of power converters, coupled in parallel, that provide power to operate the load and to charge the batteries. During normal operations, the power converters operate in a constant voltage mode to supply power to the load. The presence of a heavy load or a partially discharged battery, however, will lower the output voltage and require the power converters to switch to a constant current mode of operation.

Traditionally, a two loop controller has been used to control the power converters. A power converter employing the two loop controller typically includes a voltage loop and a current loop, coupled to a pulse width modulator (PWM). The power converter further includes a power stage, coupled to the modulator, that generates output power based on PWM signals received therefrom. The voltage loop and the current loop thus alternatively cooperate with the modulator to regulate the output power produced by the power stage.

The voltage loop includes a voltage mode controller, typically an operational amplifier (op-amp) and its associated components, that receives a feedback signal, such as an output voltage signal, from an output of the power converter. The op-amp compares the feedback signal to a reference signal and produces therefrom a control signal, such as a voltage error signal. The modulator receives the control signal from the voltage mode controller and adjusts the output of the power stage accordingly, thereby maintaining a substantially constant voltage output.

The current loop includes a current mode controller, typically an op-amp and its associated components, that receives a feedback signal, such as an output current signal, from the output of the power converter. The op-amp compares the feedback signal to a reference signal and produces therefrom a control signal, such as a current error signal. The current mode controller then sends the control signal to the modulator, which uses the control signal to adjust the output of the power stage to thereby maintain a substantially constant current output.

In a typical implementation of the two loop controller, the voltage and current loops operate in an "exclusive OR" fashion whereby only one controller (either the voltage mode controller or the current mode controller) is operational at any given time. The control signals from the voltage mode controller and the current mode controller, therefore, are usually voltage signals that are diode-coupled to the input of the modulator. Diode coupling allows the voltage and current mode controllers to dynamically acquire control of the modulator depending on the condition of the load. A major disadvantage of the two loop controller, however, is the saturation of the op-amp associated with the non-operational controller. For example, if the voltage mode controller is in control of the modulator, the current mode controller op-amp is in saturation and its output remains at a rail voltage. Therefore, if a transition between voltage mode and current mode is required, the current mode controller op-amp must ramp its output from the rail voltage to a proper operational voltage. An unacceptable period of time may pass before the output of the current mode controller op-amp reaches the required operational voltage. During this time period, the output voltage of the power converter is not regulated and may exhibit large overshoots or undershoots that may cause failures in the load equipment.

U.S. Pat. No. 5,731,692, entitled "System and Method for Limiting Overshoot in a Voltage and Current Control Circuit," issued to Garcia, et al. on Mar. 24, 1998, describes a control circuit for controlling one of at least two controllable characteristics of a controlled circuit. The aforementioned reference is incorporated herein by reference. Garcia discloses a control circuit employable to regulate the output voltage or output current of a power converter. The control circuit has an overshoot limiting circuit that prevents saturation of the non-operational error amplifier. The overshoot limiting circuit, however, increases circuit complexity and requires a significant amount of components and board real-estate.

Accordingly, what is needed in the art is a controller for DC-DC converters that, while reducing board real-estate, avoids saturation of the non-operational op-amp and provides a smooth transition between the voltage and current modes of operation.

SUMMARY OF THE INVENTION

To address the above-discussed deficiencies of the prior art, the present invention provides a controller for use with a power converter having a modulator, and a method of operating the controller. In one embodiment, the controller includes: (1) signal processing circuitry that develops a unified control signal based on both an output voltage and an output current of the power converter and (2) compensation circuitry, coupled to the signal processing circuitry, that compares the unified control signal with a reference signal to develop a modulator control signal for the modulator.

The present invention therefore introduces the broad concept of controlling a power converter with an integrated voltage and current mode controller, thus avoiding saturation of the non-operational op-amp as in the prior art two loop controller. The power converter may thereby provide a smooth transition between the voltage and current modes of operation.

In one embodiment of the present invention, the signal processing circuitry includes voltage scaling circuitry that provides a voltage mode component to the unified control signal. In an embodiment to be illustrated and described, the voltage scaling circuitry is a voltage divider. Of course, other circuits capable of converting the output voltage to a proportionate voltage employable by the controller are well within the scope of the present invention.

In one embodiment of the present invention, the signal processing circuitry includes current comparison circuitry that provides a current mode component to the unified control signal. In a related embodiment, the signal processing circuitry further includes a current sensor that monitors the output current provided by the power converter and generates a voltage representative of the output current. In another related embodiment of the present invention, the signal processing circuitry further includes a filter, coupled to the current comparison circuitry, that moderates a rate of change of the current mode component.

In one embodiment of the present invention, the power converter is part of a power plant having at least two power converters. The signal processing circuitry, therefore, receives a current sharing signal from the other power converter(s) and develops the unified control signal from the current sharing signal. In a related embodiment, the signal processing circuitry includes current sharing circuitry that compares a signal representing the output current with the current sharing signal to develop a current sharing component to the unified control signal.

In one embodiment of the present invention, the modulator is a pulse width modulator (PWM). PWM modulators are familiar to those skilled in the art.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
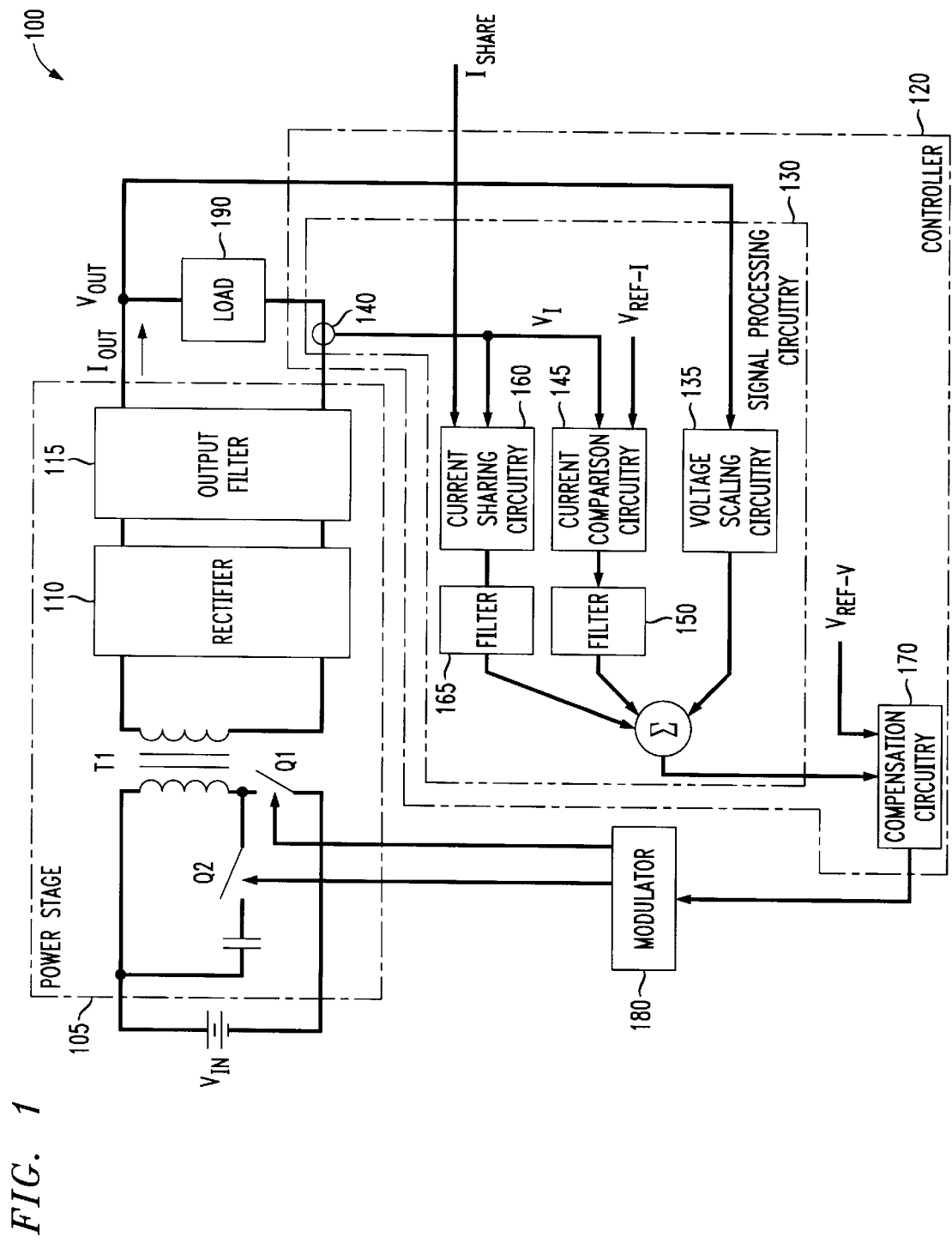
FIG. 1 illustrates a block schematic of an embodiment of a power converter constructed according to the principles of the present invention.

Referring initially to FIG. 1, illustrated is a block schematic of an embodiment of a power converter 100 constructed according to the principles of the present invention. The power converter 100 includes a power stage 105, a controller 120, and a modulator 180.

The power stage 105 processes input power and produces therefrom a regulated DC output voltage $V_{OUT}$ for application to a load 190. A conventional power stage 105 includes a number of power switches Q1, Q2 that alternately conduct current to apply a DC input voltage $V_{IN}$ across an isolation transformer T1. Those skilled in the art realize that, while the illustrated embodiment depicts a forward topology, the controller 120 of the present invention may be advantageously employed with other conventional power stage topologies. The power stage 105 further includes a rectifier 110, coupled to the isolation transformer T1, that rectifies a periodic waveform supplied by the isolation transformer T1. The power stage 105 still further includes an output filter 115, coupled to the rectifier 110, that filters the rectified waveform to supply the DC output voltage $V_{OUT}$ at an output of the power converter 100. Those skilled in the art are familiar with conventional rectifier and output filter topologies and, as a result, the rectifier 1 10 and output filter 115 will not be further described.

The controller 120 is coupled between the output of the power converter 100 and the modulator 180. In the illustrated embodiment, the controller 120 includes signal processing circuitry 130 and compensation circuitry 170. The signal processing circuitry 130 monitors the output voltage $V_{OUT}$, an output current $I_{OUT}$ and a current sharing signal $I_{SHARE}$ and develops therefrom a unified control signal. The compensation circuitry 170 compares the unified control signal to a voltage reference signal $V_{REF-V}$ to develop a modulator control signal to the modulator 180. The controller 120 may thus regulate the output voltage or output current of the power converter 100.

The signal processing circuitry 130 includes voltage scaling circuitry 135 that receives the output voltage $V_{OUT}$ and develops therefrom a voltage mode component of a unified control signal. The signal processing circuitry 130 further includes a current sensor 140 that monitors the output current $I_{OUT}$ and develops therefrom a signal $V_I$ representative of the output current $I_{OUT}$. The signal processing circuitry 130 further includes current comparison circuitry 145 that compares the signal $V_I$ (representative of the output current $I_{OUT}$) to a current limit signal $V_{REF-I}$ representative of a desired output current limit and develops therefrom a current mode component of the unified control signal. The signal processing circuitry 130 further includes a filter 150, coupled to the current comparison circuitry 145, that moderates a rate of change of the current mode component.

In the illustrated embodiment, the controller 120 is designed for use with multiple power converters 100. The signal processing circuitry 130, therefore, further includes current sharing circuitry 160 that receives the current sharing signal $I_{SHARE}$ and the signal $V_I$ representative of the output current $I_{OUT}$ and develops therefrom a current sharing component of the unified control signal. A current sharing filter 165, coupled to the current sharing circuitry 160, smooths and filters the current sharing component of unified control signal. The signal processing circuitry 130 thus develops the unified control signal based on the output voltage $V_{OUT}$, output current $I_{OUT}$ and current sharing signal $I_{SHARE}$.

The compensation circuitry 170 is coupled to the signal processing circuitry 130 and receives the unified control signal therefrom. The compensation circuitry 170 further receives a voltage reference signal $V_{REF-V}$ representative of a desired output voltage. The compensation circuitry 170 compares the unified control signal with the voltage reference signal $V_{REF-V}$ and develops therefrom the modulator control signal.

The modulator 180 is coupled between the controller 120 and the power switches Q1, Q2 of the power stage 105. The modulator 180 receives the modulator control signal from the controller 120 and develops therefrom drive signals employable to drive the power switches Q1, Q2 of the power stage 105, respectively, into conduction and non-conduction modes. In one embodiment of the present invention, the modulator 180 is a PWM modulator. The modulator 180, therefore, generates PWM control signals to drive the control terminals of the power switches Q1, Q2. The modulator 180 and controller 120 thus cooperate to regulate the output voltage $V_{OUT}$ or output current $I_{OUT}$ of the power converter 100 by adjusting a duty cycle of the power switches Q1, Q2. The output voltage $V_{OUT}$ or output current $I_{OUT}$ may thus be maintained at a relatively constant level despite relative fluctuations in the input voltage $V_{IN}$ and the load 190.

By employing a unified control signal, the controller 120 is capable of regulating the output voltage $V_{OUT}$ and output current $I_{OUT}$ of the power converter 100 to provide a smooth transition between the voltage and current modes of operation, thereby avoiding the deficiencies of the prior art two loop controller.

Figure 2:
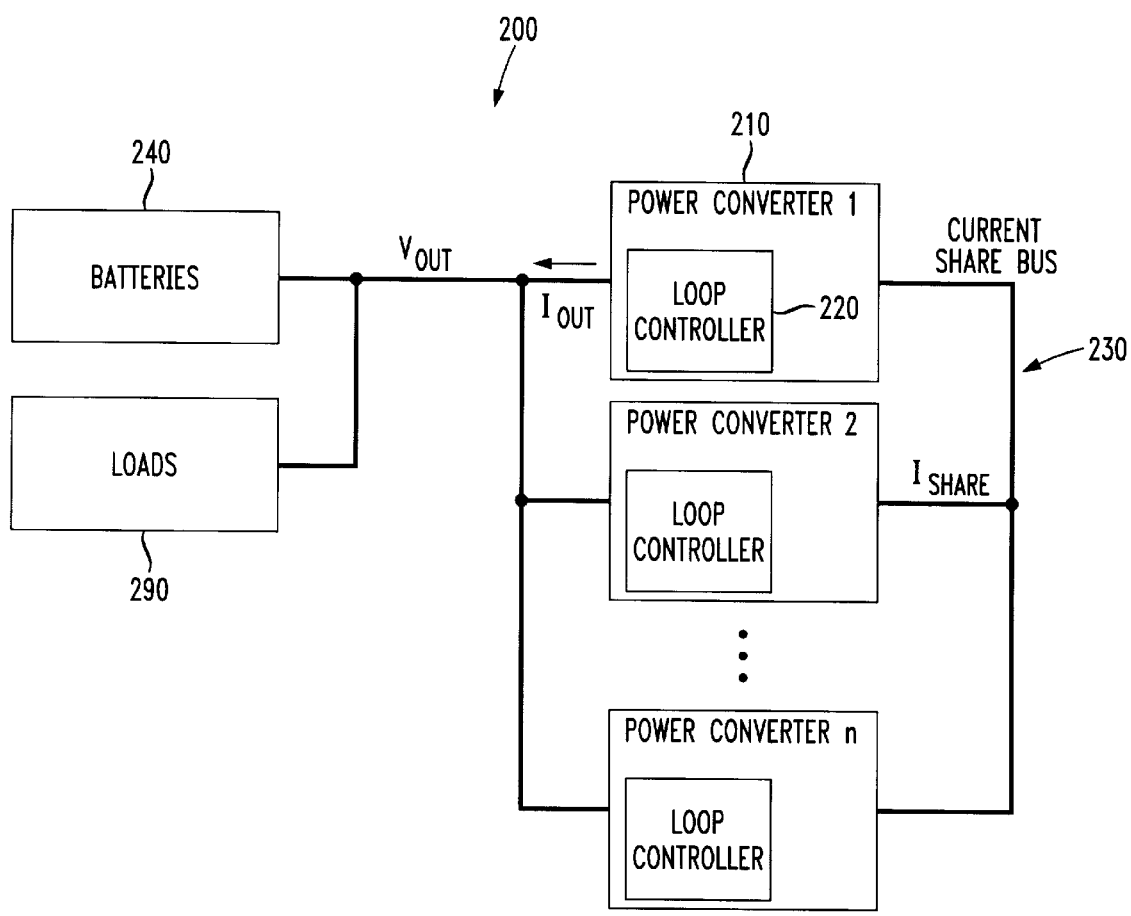
FIG. 2 illustrates a simplified block schematic of an exemplary power plant for use with telecommunication systems providing an environment for the present invention.

Turning now to FIG. 2, illustrated is a simplified block schematic of an exemplary power plant 200 for use with telecommunication systems providing an environment for the present invention. The power plant 200 includes a number of parallel-coupled power converters (one of which is designated 210), each having a controller (one of which is designated 220) constructed according to the principles of the present invention. The power plant 200 further includes batteries 240 coupled to the power converters 210 and the loads 290. The batteries 240 provide back-up power to the loads 290 when the input power is unavailable. The power converters 210 convert either commercial AC power or DC power (e.g., from the batteries 240) to regulated DC power for powering the loads 290.

The power plant 200 further includes a current share bus 230, coupled to the power converters 210. In one embodiment of the present invention, wherein a so-called "master-slave" current sharing scheme is used, the current share bus 230 carries a current sharing signal $I_{SHARE}$ representative of the highest current provided by the power converters of the power plant 200. Of course, other current sharing schemes are well within the broad scope of the present invention. By comparing the output current $I_{OUT}$ of its associated power converter 210 to the current sharing signal $I_{SHARE}$ an individual controller 220 can determine whether its associated power converter 210 is providing an appropriate share of the load current. The current share bus 230 thus allows the controllers 220 to balance the output currents of the respective power converters 210.

Figure 3:
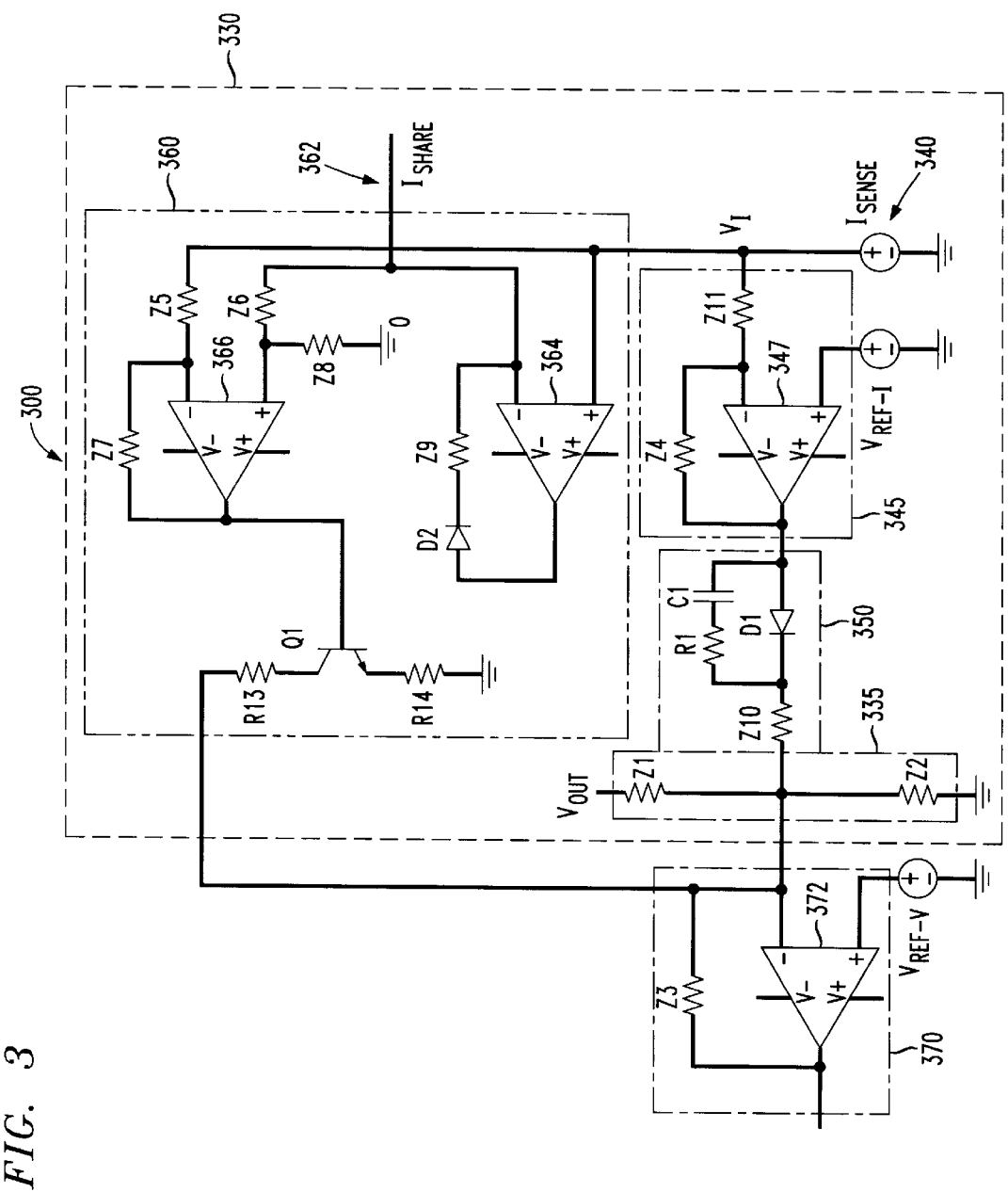
FIG. 3 illustrates a simplified schematic of an embodiment of a controller constructed according to the principles of the present invention.

Turning now to FIG. 3, illustrated is a simplified schematic of an embodiment of a controller 300 constructed according to the principles of the present invention. With continuing reference to FIGS. 1 and 2, the controller 300 operates with a power converter (such as the power converter 210 of FIG. 2) to regulate an output thereof. The controller 300 includes signal processing circuitry 330 and compensation circuitry 370. The signal processing circuitry 330 receives an output voltage $V_{OUT}$ and an output current $I_{OUT}$ (represented by voltage source 340) from the output of the power converter and a current sharing signal $I_{SHARE}$ from a current share bus 362 and develops therefrom a unified control signal. The compensation circuitry 370 then compares the unified control signal to a voltage reference signal $V_{REF-V}$ to develop a modulator control signal. A modulator (such as the modulator 180 of FIG. 1), receives the modulator control signal and develops therefrom drive signals employable to drive the power switches of the power converter. The modulator and the controller 300 thus cooperate to regulate the output voltage or output current of the power converter.

In the illustrated embodiment, the signal processing circuitry 330 includes voltage scaling circuitry 335 (e.g., a voltage divider formed by first and second impedance elements Z1, Z2) coupled to an output of the power converter to receive the output voltage $V_{OUT}$. The voltage scaling circuitry 335 scales the output voltage $V_{OUT}$ to develop a voltage mode component of the unified control signal.

The signal processing circuitry 330 further includes a current sensor (illustrated as a voltage source 340) that monitors the output current $I_{OUT}$. The current sensor 340 provides a signal $V_I$ representative of the output current $I_{OUT}$. The signal processing circuitry 330 further includes current comparison circuitry 345 (e.g., op-amp 347 and its associated components Z4, Z11) that compares the signal $V_I$ to a current limit signal $V_{REF-I}$ representative of a desired output current limit and develops therefrom a current mode component of the unified control signal. The signal processing circuitry 330 further includes a filter 350, coupled to an output of the current comparison circuitry 345. In the illustrated embodiment, the filter 350 includes a diode D1, a series-coupled resistor R1 and capacitor C1, coupled across the diode D1, and an impedance element Z10. The filter 350 moderates a rate of change of the current mode component of the unified control signal.

In the illustrated embodiment, wherein the controller 300 is designed to operate the power converter as part of a power plant containing a plurality of power converters (such as the power plant 200 of FIG. 2), the signal processing circuitry 330 still further includes current sharing circuitry 360. The current share bus 362, coupled to each power converter of the power plant, carries the current sharing signal $I_{SHARE}$. In the illustrated embodiment, the controller 300 employs a master-slave current sharing scheme. Those skilled in the art are familiar with a variety of current sharing schemes, including master-slave and average current schemes. The current sharing circuitry 360 (e.g., op-amps 364, 366, switch Q1 and associated components) compares the signal $V_I$ representative of the output current $I_{OUT}$ to the current sharing signal $I_{SHARE}$ and develops therefrom a current sharing component to the unified control signal. In the illustrated embodiment, the current sharing component indicates an extent to which the power converter is supplying its proportionate share of the total output current of the power plant. The signal processing circuitry 330 then sums the voltage mode, current mode and current sharing components to develop the unified control signal.

The compensation circuitry 370 is coupled to the output of the signal processing circuitry 330 and receives the unified control signal therefrom. Additionally, the compensation circuitry 370 receives a voltage reference signal $V_{REF-V}$ representative of a desired output voltage. In the illustrated embodiment, the compensation circuitry 370 includes an op-amp 372 and an associated impedance element Z3. The compensation circuitry 370 compares the unified control signal with the voltage reference signal $V_{REF-V}$ to develop the modulator control signal.

Since the compensation circuitry 370 develops the modulator control signal based on the unified control signal, the op-amp 372 of the compensation circuitry 370 is operational regardless of whether the power converter is operating in voltage or current mode. The op-amp 372 of the compensation circuitry 370 therefore avoids the saturation problems associated with the two loop controllers of the prior art.

Those skilled in the art should understand that the previously described embodiment of the controller (and applications employed therewith) is submitted for illustrative purposes only, and other embodiments capable of providing an integrated voltage and current mode controller are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of power electronics, including power converters and controllers therefor, see *Power Electronics: Converters, Applications and Design*, by N. Mohan, T. M. Undeland and W. P. Robbins, John Wiley & Sons Publishing Company (1989) and *Principles of power Electronics*, by J. G. Kassakian, M. F. Schlecht and G. C. Verghese, Addison Wesley (1991). The foregoing references are herein incorporated by reference.

Although the present invention has been described in detail, those skilled in the art should understand that they can make various changes, substitutions and alterations herein without departing from the spirit and scope of the invention in its broadest form.

What is claimed is:

1. For use with a power converter having a modulator, a controller, comprising:
    signal processing circuitry that develops a unified control signal based on both an output voltage and an output current of said power converter; and
    compensation circuitry, coupled to said signal processing circuitry, that compares said unified control signal with a reference signal to develop a modulator control signal for said modulator, said controller thereby capable of regulating said output voltage and said output current of said power converter.

2. The controller as recited in claim 1 wherein said signal processing circuitry includes voltage scaling circuitry that provides a voltage mode component to said unified control signal.

3. The controller as recited in claim 1 wherein said signal processing circuitry includes current comparison circuitry that provides a current mode component to said unified control signal.

4. The controller as recited in claim 3 wherein said signal processing circuitry includes a filter, coupled to said current comparison circuitry, that moderates a rate of change of said current mode component.

5. The controller as recited in claim 1 wherein said controller is designed for use with multiple power converters, said signal processing circuitry developing said unified control signal based on a current sharing signal.

6. The controller as recited in claim 5 wherein said signal processing circuitry includes current sharing circuitry that compares a signal representing said output current with said current sharing signal to develop a current sharing component to said unified control signal.

7. The controller as recited in claim 1 wherein said modulator is a pulse width modulator (PWM).

8. A method of controlling a modulator in a power converter, comprising:
    developing a unified control signal based on both an output voltage and an output current of said power converter; and
    comparing said unified control signal with a reference signal to develop a modulator control signal for said modulator, said method thereby capable of regulating said output voltage and said output current of said power converter.

9. The method as recited in claim 8 wherein said developing includes providing a voltage mode component to said unified control signal.

10. The method as recited in claim 8 wherein said developing includes providing a current mode component to said unified control signal.

11. The controller as recited in claim 10 wherein said developing includes moderating a rate of change of said current mode component.

12. The method as recited in claim 8 wherein said method is designed for use with multiple power converters, said developing including developing said unified control signal based on a current sharing signal.

13. The method as recited in claim 12 wherein said developing includes comparing a signal representing said output current with said current sharing signal to develop a current sharing component to said unified control signal.

14. The method as recited in claim 8 wherein said modulator is a pulse width modulator (PWM).

15. A power converter comprising:
    a power stage having at least one power switch to transfer energy between an input and output of said power converter;
    a modulator, coupled to said power stage, that develops a drive signal to control said at least one power switch; and
    a controller, coupled between said power stage and said modulator, comprising:
        signal processing circuitry that develops a unified control signal based on both an output voltage and an output current of said power converter; and
        compensation circuitry, coupled to said signal processing circuitry, that compares said unified control signal with a reference signal to develop a modulator control signal for said modulator, said controller thereby capable of regulating said output voltage and said output current of said power converter.

16. The power converter as recited in claim 15 wherein said signal processing circuitry includes voltage scaling circuitry that provides a voltage mode component to said unified control signal.

17. The power converter as recited in claim 15 wherein said signal processing circuitry includes current comparison circuitry that provides a current mode component to said unified control signal.

18. The power converter as recited in claim 17 wherein said signal processing circuitry includes a filter, coupled to said current comparison circuitry, that moderates a rate of change of said current mode component.

19. The power converter as recited in claim 15 wherein said controller is designed for use with multiple power converters, said signal processing circuitry developing said unified control signal based on a current sharing signal.

20. The power converter as recited in claim 19 wherein said signal processing circuitry includes current sharing circuitry that compares a signal representing said output current with said current sharing signal to develop a current sharing component to said unified control signal.

21. The power converter as recited in claim 15 wherein said modulator is a pulse width modulator (PWM).

* * * * *

UNITED STATES PATENT AND TRADEMARK OFFICE
CERTIFICATE OF CORRECTION

| | | |
|---|---|---|
| PATENT NO. | : 6,134,122 | |
| APPLICATION NO. | : 09/232444 | |
| DATED | : October 17, 2000 | |
| INVENTOR(S) | : Chen et al. | |

It is certified that error appears in the above-identified patent and that said Letters Patent is hereby corrected as shown below:

On the Title Page, in Item (73), delete "N.J." and insert -- N.J. (US) --, therefor.

On the Title Page, below "Assistant Examiner", in Column 2, insert Item -- (74) Attorney, Agent, or Firm: TUNG T NGUYEN --.

In the Specification

Column 5, Line 52, delete "thereof" and insert -- thereof. --, therefor.

Column 5, Line 53, delete "circuitry330" and insert -- circuitry 330 --, therefor.

Column 7, Line 16, delete "power" and insert -- Power --, therefor.

In the Claims

Column 7, Lines 34-36, Claim 1, delete "controller thereby capable of regulating said output voltage and said output current of said power converter." and insert -- controller operating said power converter in a selected one of an output voltage regulation mode and an output current regulation mode. --, therefor.

Column 8, Lines 1-3, Claim 8, delete "said method thereby capable of regulating said output voltage and said output current of said power converter." and insert -- said power converter thereby operating in a selected one of an output voltage regulation mode and an output current regulation mode. --, therefor.

Column 8, Line 10, Claim 11, delete "controller" and insert -- method --, therefor.

Column 8, Lines 39-41, Claim 15, delete "controller thereby capable of regulating said output voltage and said output current of said power converter." and insert -- controller operating said power converter in a selected one of an output voltage regulation mode and an output current regulation mode. --, therefor.

Signed and Sealed this
Fifteenth Day of March, 2016

Michelle K. Lee
*Director of the United States Patent and Trademark Office*